Feb. 13, 1934.   P. W. DORST   1,946,934
DEVICE FOR TAKING AND PROJECTING MOTION PICTURES
Filed March 9, 1929   4 Sheets-Sheet 1
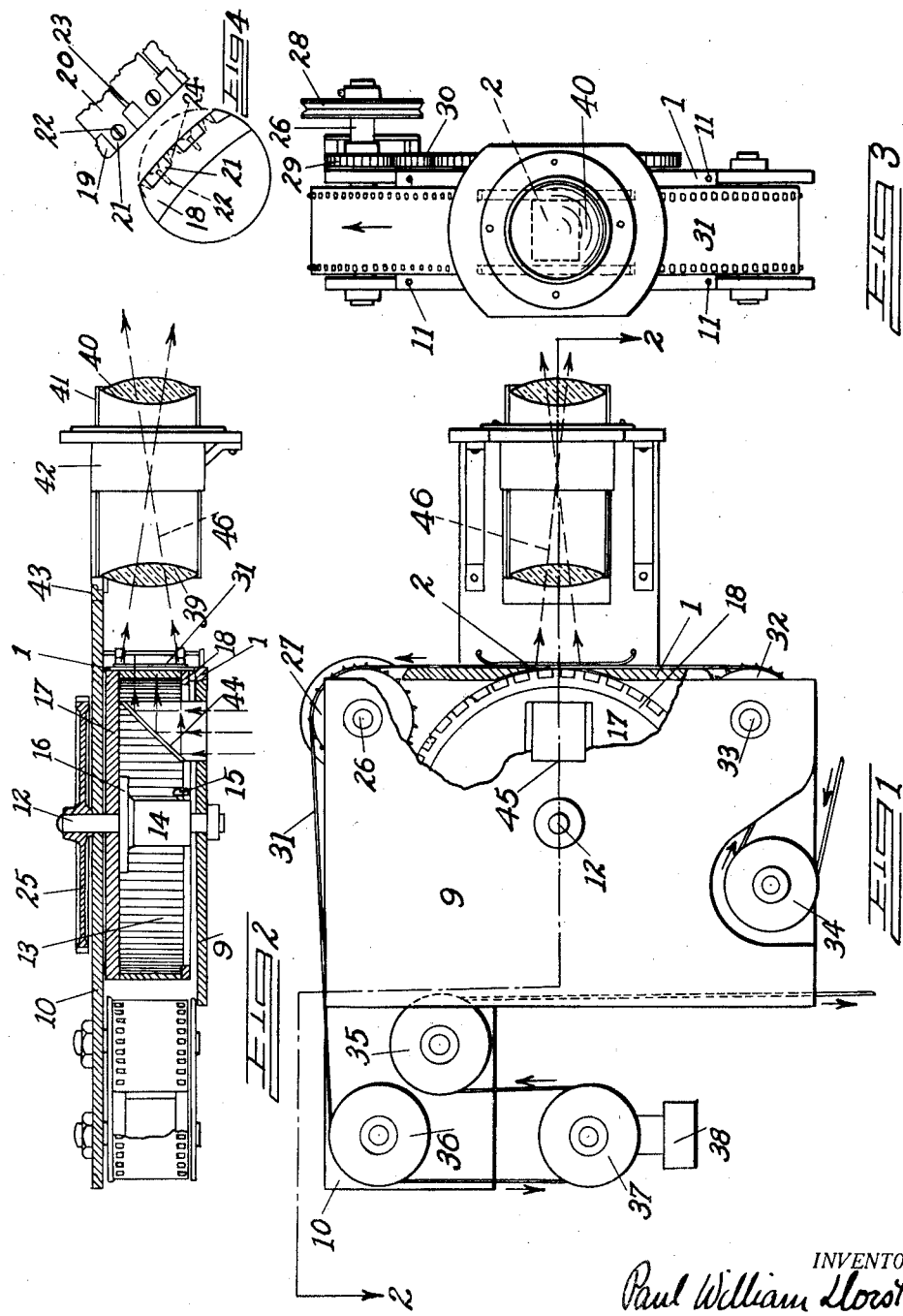
INVENTOR.
Paul William Dorst
BY
Allen + Allen
ATTORNEYS.

Feb. 13, 1934.     P. W. DORST     1,946,934
DEVICE FOR TAKING AND PROJECTING MOTION PICTURES
Filed March 9, 1929     4 Sheets-Sheet 2

INVENTOR.
Paul William Dorst
BY Allen & Allen
ATTORNEY.

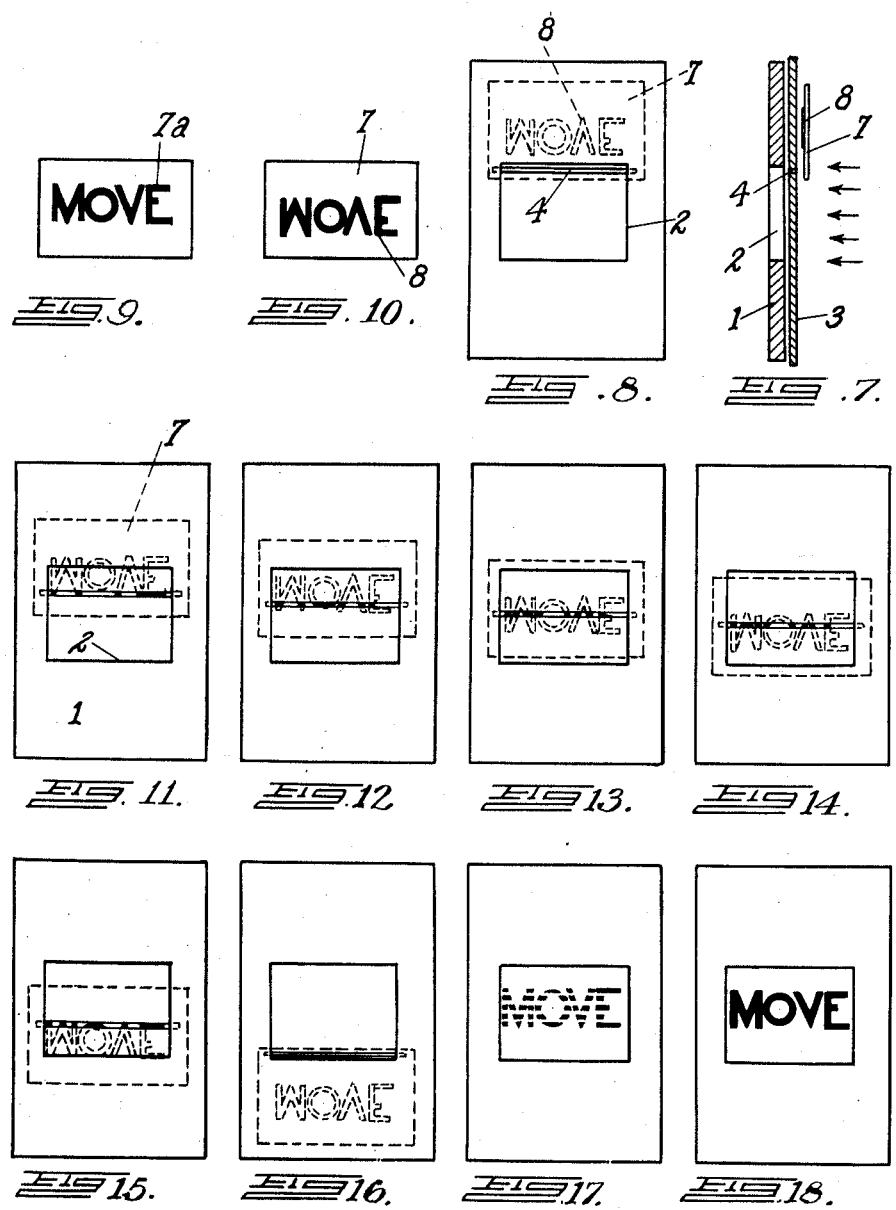

INVENTOR.
Paul William Dorst
BY Allen + Allen
ATTORNEYS.

Patented Feb. 13, 1934

1,946,934

UNITED STATES PATENT OFFICE 1,946,934

DEVICE FOR TAKING AND PROJECTING MOTION PICTURES

Paul William Dorst, Cincinnati, Ohio, assignor of one-tenth to Allen & Allen, Cincinnati, Ohio, a firm composed of Marston Allen, Erastus S. Allen, and Gibson Yungblut Application March 9, 1929. Serial No. 345,809

15 Claims. (Cl. 88—16.8)

My invention is addressed to the provision of means for taking and projecting motion pictures upon ordinary film by means and a process which permit the steady and uninterrupted movement of the film. It is well known that the disadvantages of present day motion picture equipment reside in the necessity of stopping the film for each separate exposure in the camera, and for each separate projection stage in the projector. Means for stopping the film intermediate its travel and then moving it very rapidly to the next stage are of necessity complicated and cumbersome, particularly in view of the fact that at ordinary speeds the film travels at the rate of about sixteen separate pictures per second past a given point. Aside from the expense and complication of the apparatus necessary to effect this intermittent movement, the wear upon the film is a very serious disadvantage, so much so that the life of an average film is very short. Much work has been done by various investigators toward the provision at least of projecting systems which will permit the smooth and continuous travel of the film. So far as I am aware this work has resulted only in proposals involving either travelling lens systems, which move while the film is moving, or moving refractive or reflective systems. In other words these proposals have uniformly involved the projection of an image on a screen in such a way that while the image is travelling, the optical system is also moving, so that the screen image remains in the same place throughout a given section of the travel of the film image, and until a second film image may be projected upon the same place. A type of camera has been evolved also, I believe, in which while the stationary objective is provided, a film is caused to move with the image; but this is of value only in obtaining photographs of very rapidly moving objects with complete disregard of the background or surrounding stationary objects, and is not applicable to either the taking or projection of motion picture films, which are intended to give an undistorted picture.

By my invention I provide a very simple means for taking or projecting motion pictures upon a moving film without the provision of more than one optical system, and without the provision of any moving optical system or systems. The advantages of this will immediately be clear and do not require description by me. In my invention I employ a new principle which involves the provision of moving slits in connection with a moving film, with a stationary single optical system, and in the projector, a stationary single source of light.

My objects I accomplish by that series of steps in the process, and by that arrangement of parts in the apparatus, of which I shall now describe a preferred embodiment, reference being had to the drawings which accompany these specifications.

In the drawings:—

Figure 1 is a side elevation, with sectional parts, of a projection apparatus.

Figure 2 is a sectional view thereof taken from above.

Figure 3 is an end elevation.

Figure 4 is a partial detail view of my drum.

Figure 7 is a sectional view of a model, which will illustrate the principle of operation of my device.

Figure 8 is an elevation thereof.

Figure 5:
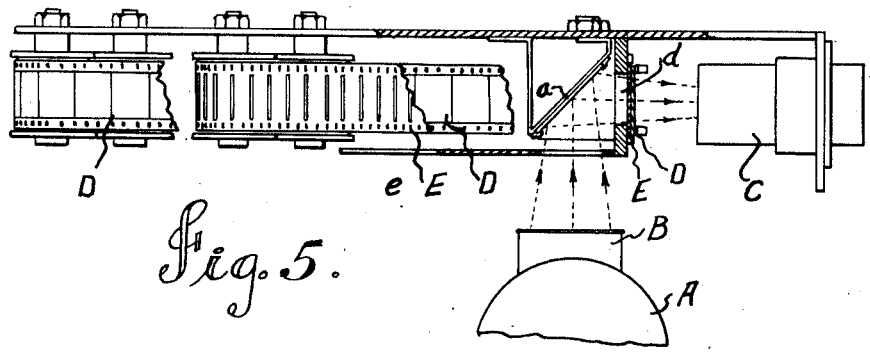
Figure 5 is a plan view of a modified apparatus, partly in section.

Figures 9 to 18, inclusive, are a series of step illustrations, illustrative of the manner in which my pictures are projected.

Figures 19 to 26, inclusive, are diagrammatic step illustrations of the operation of the principle involved in my invention.

Broadly speaking, I provide either in my camera, or in my projector, a film moving at a certain speed, a member having a slit (for the passage of light) moving at a different speed, and a suitable single optical system, together with a source of light in the projector. The use of these devices results in an end for end reversal of the image, either upon the film in the process of taking the picture, or upon the screen in the process of projecting it. The manner of operation of my device is necessary of comprehension before my apparatus may be understood, and therefore, I shall now explain first the operation of the principle involved in my invention in detail.

As heretofore stated, the operation of my device results in and of itself in a reversal of the image. The objective in the projector may, and the lens in the camera does, also produce a reversal of the image. This reversal of the image, which is the effect of the optical system, is a super-added reversal, which is not to be confused with that reversal which occurs due to the combined action of the moving slit and the moving film. The reversal produced by the optical system is simply super-added to the reversal produced in the manner which I shall presently describe, and it will be compensated for exactly as is done in present day apparatus. Therefore, in considering the following explanation, the reversal which is due solely to the optical system employed, should be wholly disregarded.

Referring now to Figures 19 to 26, I have shown a member 1, which is an inert non-moving plate, having an opening therein, through which an image may be seen. This opening I have indicated by the numeral 2, and it serves simply to define the space through which the projected or transmitted light is effective. It is comparable to the framing aperture upon the present day motion picture projector, the service of which is to confine the projected image to no more nor less than a single picture. In the diagrammatic showing of Figures 19 to 26, I have illustrated as lying behind this framing or gate opening, a member 3, which bears a narrow slit 4, and is adapted for vertical movement in its own plane. I have also illustrated an image 5, which in this instance is a figure representing a man, with arms and legs, and is also adapted for movement in its own plane, which is parallel to the plane of 3, but is shown otherwise for the sake of clearness. I have illustrated in Figure 19, an eye 6, which sees the image through the slit; and for the purpose of a clear showing, I have ilustrated in Figure 19 and the remainder of the figures, the image in front of the eye, which the eye is supposed to see.

As hereinbefore stated in employing my principle, the member 3 bearing the narrow slit moves downwardly at a certain speed $V_s$. The image itself (which in the case of a projector lies on the film) also moves in the same direction at double speed, which I will call $V_t$; thus $V_t=2V_s$. In the diagrams comprising Figures 19 to 26, I have divided the passage of the image before the framing opening into eight stages.

Figure 19:
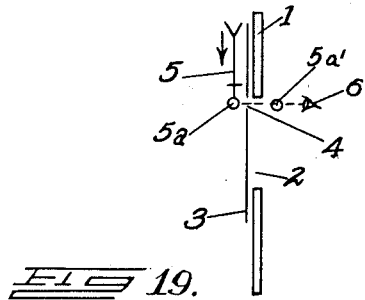

It is also to be observed that in Figure 19, the image is upside down. The slit 4 in the member 3 is at the top of the framing area, or in the first stage. The first part of the image, the head $5a$, lies opposite this slit, and the eye sees the head as an image, which I have indicated at $5a'$.

Figure 20:
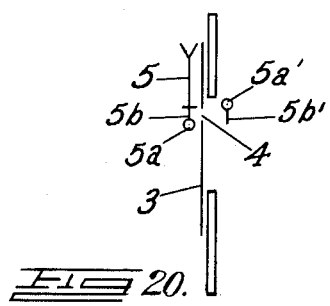
Figure 21:
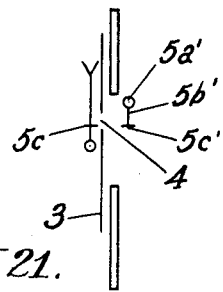

In the next figure, Figure 20, the member 3 has moved downwardly to the second stage, the image 5 has moved down twice as far, so that instead of the head $5a$, remaining opposite the slit 4, (as it would do if the speeds were the same) the neck $5b$ is now opposite the slit 4, and the eye sees an image of this neck $5b$, which I have indicated by the numeral $5b'$. If it is imagined now that the image $5a'$ persists before the eye (the visual persistence of an image is the reason why motion pictures appear to move when shown), then it will be seen that an image has thus far been built up comprising a head $5a'$, and a neck $5b'$; but in the visual image, the neck lies below the head; whereas in the actual image the neck lay above the head. Next in Figure 21 the slotted member 3 has moved downwardly so that the slit 4 is in the third stage. The slit is now opposite the arms $5c$ of the image of the man, and the eye sees a visual image of these arms indicated at $5c'$. The resident image before the eye now presents a head $5a'$, a neck $5b'$ and arms $5c'$.

Figure 22:
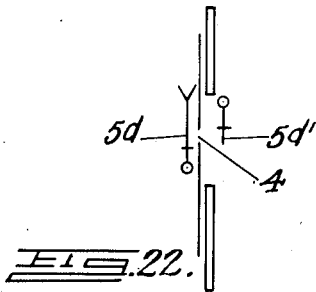
Figure 23:
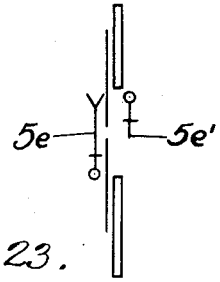
Figure 24:
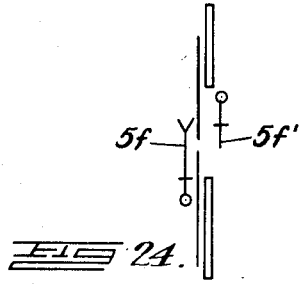
Figure 25:
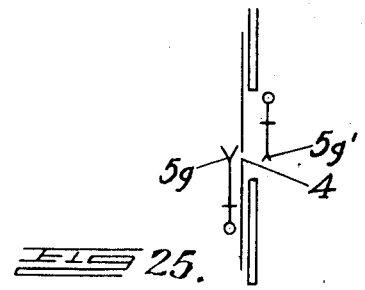
Figure 26:
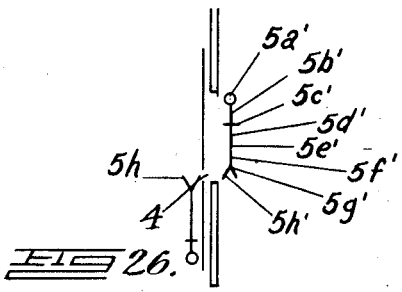

In Figure 22, the slit 4 is in the fourth position, and a portion $5d$ of the body is translated into a corresponding image portion $5d'$. Similarly in Figures 21 and 22, additional portions of the body $5e$ and $5f$ have been translated into image portions $5e'$ and $5f'$. In Figure 23, the slit 4 has moved down to the seventh stage. The primary image moving twice as fast, has now arrived at a point where the upper part $5g$ of the legs is opposite the slit, and is translated into an image $5g'$.

In the eighth stage (Figure 26), the lower part of the legs $5h$ is opposite the slit 4, and is translated into an image $5h'$.

It will now be seen that the visual image comprises a head $5a'$, a neck $5b'$, arms $5c'$, body portions $5d'$, $5e'$, $5f'$, and upper and lower leg portions $5g'$ and $5h'$. It will be seen that whereas the real image 5 etc., was upside down, the visual $5'$ etc., is right side up. Now a word of explanation as to this reversed image is necessary. In the diagrammatic illustration, the frame has been divided into eight sections for purposes of illustration, and the motion of the real image and the member bearing the slit has been divided into eight stages. It has been shown how this results in a reversal of the image. It is to be pointed out, however, that as in Figure 19, if the eye 6 sees the head $5a$ through the slit 4, it will see this head upside down. Similarly in Figure 18 where it sees the neck portion $5b$, it will see this neck portion upside down; and so throughout the several stages, but in the visual image, the neck will fall below the head, whereas in the real image the neck fell above the head. Thus if a figure of the man 5 upon paper be cut apart, and the pieces transposed, the image will also be transposed and reversed, even though each separate piece itself will not be reversed. This is the same as saying that in the completed visual image $5'$ etc., of Figure 26, the head $5a'$ is upside down, but it lies above the neck $5b'$; the neck $5b'$ is upside down, but it lies below the head $5a'$; the arms $5c$ are upside down, but they lie below the neck $5b'$, and so on. The same effect, as has been hereinabove indicated, might be gained by placing the image 5 upon a piece of paper, cutting it apart into eight strips and transposing the strips. When a complicated image is cut apart into eight strips and transposed, a reversed image is obtained, although the result is imperfect. If the number of strips, however, into which the picture were cut, be increased, the result would be more perfect; and if it were possible to cut a picture apart into so many strips that the width of any strip would be less than the allowable visual circle of confusion, and this very large number of strips could be perfectly transposed, then a visually perfect reversed image would be obtained. This is said to point out the fact that the reversal of the image which I obtain through the use of a moving film and moving slit is not the same as that reversal of an image, which is produced by an optical system, such as a lens. By way of further clarification, let it be said that if the image $5a'$, etc., of Figure 26, were projected through a lens, it might be again reversed; but this second reversal would have nothing to do with the reversal which was brought about by the manner of projection employed by me. A lens will, of course, reverse an image up and down, and right and left. My moving slit reverses it, of course, only in one direction, which in the embodiment I have described, is up and down.

Figure 6:
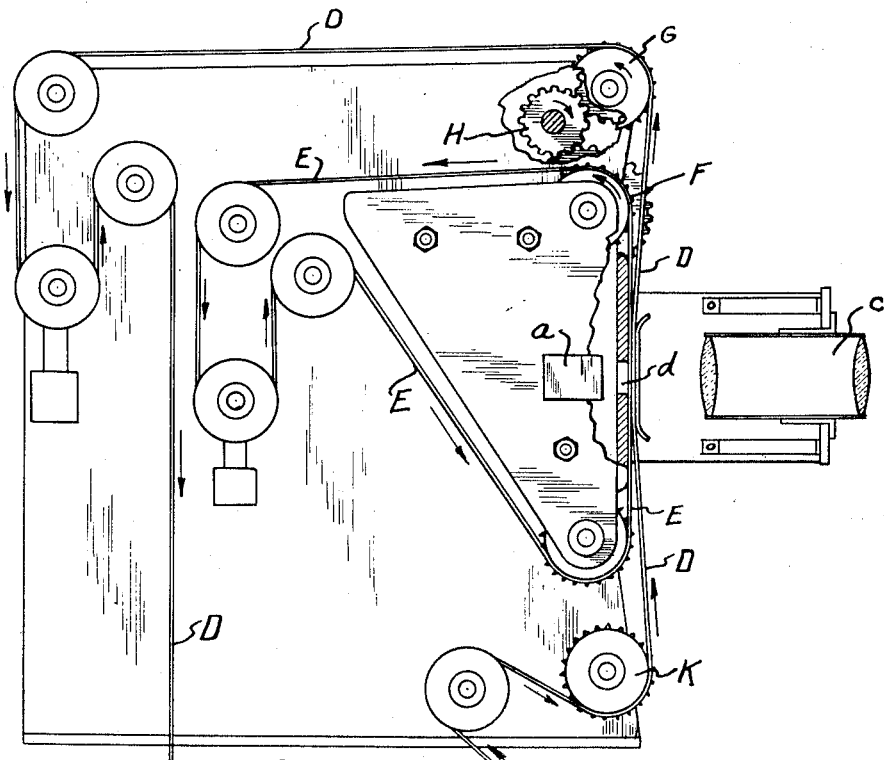
Figure 6 is a side elevation of the same, partly in section.

To provide another illustration less diagrammatic, and obviously more closely allied to actual practice in my camera and projector, I now make reference to Figures 7 to 18, inclusive. I have shown, in the nature of a model for illustrating the operation of my process and device, a member 1, with the framing opening 2, a member 3, with the slit 4, and a member 7, which bears an image 8. For purposes of visual demonstration, the members 1, 3 and 7 may be cards or pieces of paper, and the image 8 may be a word, such as the word "MOVE", printed upon the card 7. An elevation is shown in Figure 6. A convenient demonstration device may be made by providing vertical guides upon the card or plate 1 in which the cards or plates 3 and 7 may slide, and then connecting 7 to 1 by a thread which rides over the top 3, which will be somewhat extended. Then any motion of 7 downwardly will produce a corresponding downward motion of 3, but for only half the distance.

I may start with the card 7 bearing the word "MOVE" upside down, as is shown in Figure 10. I desire to finish with the image 7a shown in Figure 7, in which the word "MOVE" is right side up. In Figure 8 the slit 4 at the top of the framing opening 2 is shown in the first of seven stages, and it permits a visual inspection of the white part of the card 7 below the image thereon. In Figure 11 the slit is moved downward to the second stage, and the card 7 bearing the image, having moved twice as far, now shows the upper part of the word "MOVE". The image, of course, is upside down, but it is narrow. It is an image of the bottom of the real image 8 on the card 7, but it is located near the top of the framing opening 2. In Figures 12, 13, 14 and 15, four more stages of movement of the slitted member and the card bearing the image are shown, and the indication of the several images which the eye sees in succession. In Figure 16, the card 7 and the slitted member have been moved so that the slit, although located near the bottom wall of the framing opening 2, shows the image of the upper part of the card. Figure 17 is a literal combination of the images produced by the several stages. It will be seen that these several images are easily combined and resolvable into the image of the word "MOVE", shown in full lines in Figure 16 by continuous movement of the elements, without stopping at the distinct stages represented. Figure 17 represents only the stages shown, and does not include others which would completely fill in the image as shown in Figure 18.

As hereinabove pointed out, the transposed image of the word "MOVE" will be the more perfect the narrower the slit, and will be visually perfect when the slit is as narrow as the permissible circle of visual confusion. In the diagrammatic illustration thus far employed, it might have been assumed that the real image and the slitted member came to rest temporarily at each stage. This, of course, is not the case. The image is built up smoothly and rapidly during the continuous passage of the slitted member at a certain speed accompanied by the continuous movement of the member bearing the image, at twice that speed.

These illustrations embody the essentials of an apparatus for the projection or taking of motion picture films in accordance with my invention. Broadly speaking, therefore, both my camera and projector involve a moving film, and a moving member provided with a slit, the axis of the slit located transverse to the direction of motion of the film, the slitted member moving but half as fast as the film. In the camera, a lens will be provided to focus an image upon the moving film. In the projector a source of light will be provided to shine through the film and the slitted member, and an objective will be provided to focus the rays of light from the source upon the screen. Since in continuous practice, it is necessary to have a single slit passing across the framing opening while a single picture passes across it, it is necessary, of course, in order to scan the picture next following, either to move the slitted member back to the point where the slit is again in starting position, or to provide a plurality of slits in a continuous member, or a member adapted for continuous rotation.

Figures 5 and 6 show an example of the use of a continuous member, by which a successful and extremely simple projector may be made comprising a source of light A equipped with the necessary condensers B, a mirror a an objective C, and means for passing the film D in front of a framing opening d, a second piece of film E which carries the slits e and means for moving this second piece of film E at one-half the speed of, but in the same direction as the film which it is desired to exhibit. The film E bearing the slits may be made in the form of a continuous loop as shown, or otherwise, as desired, and the slits e may be printed on it by photographic means most conveniently, although other means may be taken. Such a projector would have a mechanism characterized by great simplicity, and comprising only, as driven parts, a sprocket wheel F for the film E bearing the slits e, a sprocket wheel G for the film to be exhibited, a gearing H between said sprockets of the proper ratio, and a driving connection K to the take-up reel. A camera may be formed also involving the use of a film bearing slits.

Films are liable to deterioration, and slight changes in size. They also cut down the light to a certain extent, and are susceptible to the heat of the light source used. Consequently I prefer to provide a rigid, continuously moving, rotatable member, with actual slits therein, in place of a piece of moving film with slits printed on it. In my preferred apparatus shown in Figures 1, 2 and 3, I provide a drum which contains a plurality of slits, and is caused to rotate at a certain peripheral speed, the film being caused to move at double the peripheral speed of the drum.

In this apparatus, I have shown a frame comprising side plates 9 and 10. An end plate 1 having an opening 2 therein is made the equivalent of the framing aperture or gate plate 1 of the diagrammatic illustrations, although if desired, a separate gate may be provided. The plates comprising the frame will be understood as held in proper relationship by suitable studs, and if desired, by being fastened to the plate 1 by screws or pins as at 11 in Figure 3. I provide a central shaft 12, journaled in side plates and bearing a drum indicated generally at 13, which is the member bearing the slits. This drum conveniently comprises a hub 14, fastened to the shaft by a set screw 15, and bearing a flange 16, upon one side. The circular plate 17 is fastened to this flange so as to rotate therewith, and this plate bears the drum proper. I have found it most convenient to build up a drum with slots rather than to slot a pre-formed drum, although this may be done, and in building up a drum as indicated, I provide a ring 18 of the same diameter as the plate 17. In this ring and in the plate, I machine slots, leaving teeth 19, and I provide bars having bodies 20, and diminished ends 21, which will fit into the slots and between the teeth, where they can be fastened by means of screws 22. The bodies of the bars 20 are accurately machined so that when the drum is assembled, there will be slots 23, accurately gauged and spaced, and of the required width, therebetween. The sides of the bars are conveniently beveled as at 24, which not only renders the slits somewhat more definite, but has another use as will hereinafter be explained. I thus obtain a drum with slots in the periphery, which slots are parallel to the drum axis, the entire drum being arranged for rotation with the shaft 12. The provision of a ring upon one side makes it possible to provide a light source, or the equivalent, extending within the drum, and lying behind the slits, as will hereinafter be more fully described. On the shaft 12, outside the frame, I provide a gear 25.

I provide another shaft 26 also journaled in the frame, and bearing a sprocket wheel 27. This sprocket wheel and the drum are the two essential working parts of my device. A pulley wheel 28 may be placed upon the shaft 26 to be driven by a belt from a motor, but power may otherwise be applied to the shaft 26, as will readily be understood. The shaft is also provided with a gear 29, which, through an idler 30, drives the gear 25, and the ratio of these gears is such that when the film 31 is placed over the sprocket wheel 27. so as to be moved thereby, the linear speed of this film will be twice the peripheral speed of the drum. I, therefore, have the essentials of the principle of my apparatus, namely, a film moving at a given linear speed and a member with slits moving at one-half that linear speed.

A second sprocket 32 is fastened on a shaft 33, journaled in the frame near the bottom, so that the film is caused to travel along the surface of the plate 1. Idler spools 34, 35 and 36 may be provided, if necessary, and in the embodiment shown, I have provided a tensioning device comprising the idlers 35 and 36, and an idler 37, to which is attached a weight 38. In many machines, this would not be necessary. The drum 13, and the film sprocket 27 are the only two driven parts of my device in this embodiment. I have shown an objective comprising lenses 39 and 40, mounted in a tube 41, which is slidable in a sleeve 42, supported as by a bracket 43, or extension of the frame plate 10. I have also shown a stationary reflecting device 44. The frame plate 9 is perforated as at 45, opposite this reflecting device, and it will be understood that in use as a projector, a lamp with suitable reflector and condenser is located outside the frame opposite the hole 45, and that the rays of light indicated in Figures 1 and 2 by the dotted lines 46, pass through this hole, and are reflected by the member 44, so as to be caused to pass through the slits 23, and thence through the film 31, and the objective lenses 39 and 40. The reflective member 44 may be a metal or glass mirror, a reflecting prism, or the equivalent.

Framing in my device may be accomplished in a number of ways. One of these is by turning the sprocket 27 slightly with reference to the gear 29, for which purpose a frictional engagement between either and the shaft may be provided. However, no framing adjustment is necessary so long as the film is started past the gate in proper relationship to the slots.

It will be understood that the apparatus described by me is exemplary and capable of modification without departing from the spirit of my invention. The pictures may be viewed direct, i. e., without the intermediary of a lens. Such an apparatus is convenient for the film inspector because it allows him to see the pictures in motion. The film may be drawn through the device by hand. If larger pictures are desired, the operator may view the film through a lens. This is exemplary of a modification within the spirit of my invention.

I have shown my device without any cover or cabinet. It will be understood that in practice any convenient form of box or enclosing container for the mechanism will be provided, and that this cabinet may contain such a spring or other driving motor as may be required, and that provision will be made for reels for the film, and the like. To change the device of Figures 1, 2, and 3, or of Figures 5 and 6, into a camera, the objective lens combination and support may be removed, and the film closed upon that side against light. The source of illumination may be removed, and in its place, a suitable lens mounted, which will, by means of the reflecting device 44, focus an image of a scene upon the film 31, the slits acting as shutters. The operation of the slits in my camera is not the same as the operation of a simple focal plane shutter, since a light opening is not caused to traverse the image space while the film is stationary. If the usual (intermittent) moving picture camera were equipped with a focal plane shutter, as might conceivably be done, the slot width could be varied at will and would do no more than control the amount of light reaching the film. With my device, because of the reversal of the image as explained, an increase in slot width would blur the image. Therefore, the slot width must not be increased beyond an allowable maximum.

Thus far in these specifications I have spoken of the practice of my invention with a film moving at a certain speed, and a member bearing a slit moving past the same opening at one-half the speed of the film. My invention is not restricted to this speed ratio, but is applicable to other speed ratios, as I shall now point out. If in a camera or projector, the film were held stationary, and a slit moved in front of it, a picture would be formed upon the film or projected from it. In a camera this would be equivalent to a focal plane shutter mechanism. Similarly if the film were moving, but the slit were moving so very much more rapidly than the film, that the film during the exposure period, would be to all intents and purposes stationary, a picture would be produced upon the film or projected from it, as the case may be; but the picture would be distorted lengthwise. If a film and a slit be moved together, no picture will be formed. My invention is concerned with a process and apparatus, in which the film and the slit are both moving in the same direction, but at different speeds. As it has already been pointed out, if the film and slit move together no picture will be formed. As the film begins to move faster than the slit, a reversed picture will be formed, distorted by being diminished in length. The distortion of this type will become less and less as the ratio of film speed to slit speed increases, until at a point where the film speed is twice the slit speed, a reversed but otherwise undistorted image will be formed or projected. This is, of course, the point at which I prefer to work for the reason that in a camera, I can thus take pictures upon a film which may be projected by standard apparatus, and in my projector I can use standard film. Still further increasing the ratio of the speed of the film to that of the slit, will result in a distortion of the pictures lengthwise by lengthening. There is, of course, between the limit on the one hand of equivalent motion of film and slit, and the limit on the other hand of a film speed infinitely greater than the speed of the slit, a safe working range, which is comparatively narrow. As already indicated, I prefer to work at a film speed which is twice the slit speed, because this gives me an undistorted image, and the speed ratios are easily and positively maintainable by gearing. However, as will hereinafter be pointed out, for certain purposes I may prefer to distort my pictures particularly by elongation.

I now come to the theoretical considerations of my process and apparatus as they have a bearing upon the practice thereof, and the construction of a successful camera or projector. Instead of exposing in the case of a camera, or projecting in the case of exhibition, a complete single picture at one time, I am building up a whole picture by causing a line of illumination of varying and changing intensity to traverse the image area. The manner of operation of this has already been explained. In order that the phenomenon upon which my invention is based, may be taken advantage of successfully, the slit must move across the aperture rapidly enough so that the retina of the eye retains the image of the slit in its initial position until the slit has completed its traverse. This retention of an image on the retina, after its actual disappearance, will be recognized as the "persistence of vision" upon which the success of all motion pictures depends. In using my device either for the projection or for the taking of standard motion picture films, it is easy to calculate the various constants which will determine the speed and the proportions of the various parts. Assume that a picture film of the usual professional dimensions is to be used, on which the images are $h_1$ inches high, and that $p$ pictures pass the gate per second. The constant speed, $V_f$, of the film, is then $ph_1$ inches per second. One slit, and only one, must be provided for each picture projected, so that no pictures are omitted. A series of slits arranged around the circumference of a drum is a convenient arrangement, the spacing being as required for the case in hand.

If the constant speed of the slits be represented by $V_s$, the speed of the slits relative to the film, $$V_{sf} = V_s - V_f \qquad (1)$$

The time required for a slit to sweep one moving image, $$t_1 = \frac{h_1}{V_s - V_f} \text{ (seconds)} \qquad (2)$$

The absolute distance $h_2$, over which the slit moves during the time $t_1$, is $$(h_2 =) V_s t_1 = \frac{h_1 V_s}{V_s - V_f}. \qquad (3)$$

$h_2$ is therefore the height of the built-up image. A negative sign before $h_2$ indicates that the built-up image faces the direction opposite to that in which the moving images face.

It is thus seen that the height of the built-up image may be varied at will by changing the value of $$\frac{V_s}{V_{sf}}$$

or $$\frac{V_s}{(V_s - V_f)}$$

which is the characteristic of the gearing which connects the slit-member with the driving film-sprocket. To satisfy the condition that one slit be provided for each moving image, it is seen that the number of slits passing any given point in unit time must equal the number of images passing that point in unit time. Then $p$ slits must pass a fixed point each second, and the linear spacing of the slits, $$d = \frac{V_s}{p}. \qquad (4)$$

Another relation is $$\frac{pd}{ph_1} = \frac{V_s}{V_f} = \frac{d}{h_1}$$

and $$d = h_1 \cdot \frac{V_s}{V_f}. \qquad (5)$$

*Practical application.*—By applying the relations just brought out to the case in which it is desired to project from standard professional film without any change in the height of image, the following values are found:

$h_1 = 0.75''$ = height of images on film,
$p = 16$ to $20$ = no. of pictures projected per second,
$V_f = 12$ to $15''/\text{sec.}$ = linear speed of film,
$h_2 = \pm 0.75''$, given,
$V_s = 6''/\text{sec.}$ = linear speed of slits (for $p = 16$, $V_f = 12''$, $h_2 = -0.75''$, from (3)),
$d = 0.375''$ = slit spacing (from Equation (4) or from (5).)

It will thus be seen that in my projector or camera, I will make provision for the driving of the film 31 by means of the sprocket 27, so that it has a linear speed of 12 to 15 inches per second, and so that the drum has a peripheral speed of one-half the linear speed of the film. Thus the slots will move past the gate at a speed of 6 to 7½ inches per second. I will have a drum provided with slots spaced 0.375 inches on centers for the given peripheral speed. The size of the drum is a matter of convenience, providing it is some multiple of 0.375 inches in circumference. With a smaller drum, the number of revolutions per second will be increased, and conversely with a larger drum, the slit spacing and the peripheral speed remaining the same.

Since the height of the exemplary image of standard film is 0.75 inches, and since the spacing (or pitch) of my slits in the preferred embodiment of my invention is 0.375 inches, it will be seen that excepting for the instant when a slit is in the exact center of the framing opening, the screen in my projector and the film in my camera, will be illuminated by two slits at once, the two slits having to do with separate and consecutive film images. This is of advantage in two ways. It doubles the illumination upon the screen, and enhances the smoothness of action of the pictures shown in projection, for the reason that an image of the second consecutive picture is being built up while the image of the first consecutive picture is being finished. Of course, by doubling the spacing of my slots, I can illuminate the screen in projection by but one slot at a time; but in this case I would be projecting only every other picture upon the film, for the reason that the film moves twice as fast as the slit, and two film pictures will have moved past the framing opening by the time one slit has moved past it. The projection of sections of two images upon separate parts of the screen at one time is capable of being utilized in a number of directions. An exemplary use may be in the taking and projection of color motion pictures, in which the colors are formed by the combination of two rather than three primary colors. Thus both in the camera and in the projector, alternate slits may be red and green, to act as complementary two-color filters, and to build up upon the film in taking and upon the screen in projection, alternate red and green images.

Of course, the width of the slits is a very important factor in determining the degree of detail which may be obtained. If the slits are too wide, the vertical detail will be poor, and if they are made too narrow, the illumination will suffer too greatly. At first thought, each slit should be made just as wide as the diameter of the maximum circle of confusion permitted in the image (0.0004 inches on professional motion picture films). However, satisfactory detail for most purposes has been obtained with slits 0.002 inches wide. Sharp reproductions of small lettering on sub-titles is thus satisfactorily reproduced, and satisfactory details in scenes and faces are attained. It is not believed possible to widen the slits very much beyond this point, however, with standard motion picture film; but it is interesting to note that no diffraction effects are visible when using slits 0.002 inches wide.

With a 200 watt lamp, and a projector built in accordance with the drawings which accompany these specifications, it is not difficult to secure adequate illumination over a screen area two feet wide. A number of ways are possible of increasing the illumination, some of which will be taken up hereinafter. One, having to do with the width of the slit, is conveniently taken up at this point. The reversal of the image which is produced in projecting pictures by my process, and device, is a reversal which occurs in one direction, and consequently is effective in increasing the circle of confusion in but one direction. Thus, if, as in professional motion picture films, a circle of confusion of 0.0004 inches is permissible, there were some way of holding to this circle of confusion transverse of the film while permitting a greater circle of confusion lengthwise of the film, a wider slit could be used. This would naturally result in a distortion of the image upon the film in a lengthwise direction, but it can be accomplished by taking pictures with my camera in which the linear speed of the film is greater than twice the peripheral speed of the drum, and maintaining the same speed ratio when projecting the pictures. Thus pictures distorted lengthwise by elongation, may be projected with a wider slit (and hence greater illumination), and can be rectified in the projection thereof by maintaining the same relative speeds of film and drum as that under which the pictures were taken. However, such a procedure is wasteful of film, and I am inclined to believe it better to adhere to undistorted film images in machines of ordinary size, and by other means increase the intensity of the illumination passing through the slits. It is to be pointed out that not much danger is to be met in doing this because the film passes each slit so very rapidly that it will not be detrimentally affected even by a comparatively very high heat.

The great loss of illumination incident to the employment of the principle utilized by me, may be partly overcome by making each slit passage wedge-shaped as shown in Figure 4, and making each wedge passage with reflecting walls, so that some light will be reflected into the slit, which would not otherwise reach the opening. Of course, the most obvious way of increasing the intensity of the illumination is by increasing the intensity of the source, or by condensing the light of a source more effectively into a very thin beam, as might be done by combinations of specially shaped spherical and cylindrical reflectors and condensers.

In general the advantages of my process and apparatus may be summed up as follows: All intermittent mechanism is eliminated, and with it excessive wear on the moving parts, excessive wear on the sprocket holes in the films, breaks in the film, due to rapid acceleration and deceleration, the present limitations upon the permissible speed of operation, and the appreciable noise caused by the intermittent mechanism. The wear on the film is a matter of great importance, and whereas film wears out very rapidly when used with intermittent mechanisms, I have run through my projector an endless length of about 150 ft. of film for a period as long as 24 hours of continuous operation, without the film showing any signs of wear whatever. The film in my device is exposed to the direct heat from the light source for a much smaller length of time than is the case with intermittent projectors. The number of moving parts is reduced to a minimum. The power required to drive the mechanism is minimized. Active optical compensation for the motion of the film is not required. Instead of an arrangement of complicated moving parts, I find it necessary only to provide a succession of accurately spaced slits, which are moved in synchronism with the film, and this construction is not only very much cheaper, but is not liable to mal-adjustment.

If the slits become clogged with specks of opaque matter, these specks will produce somewhat the effect of falling rain, in the picture. This can be overcome by means for continuously cleaning the slits as by blowing a blast of air against them to dislodge specks of dust, or by enclosing the entire mechanism in a dust-proof container.

Various modifications of my apparatus are possible. Instead of moving the slits, a moving line of light may, of course, be used, assembled in proper relationship with the speed of the film, and the thin line of light may be produced by mechanical or optical means.

Having thus described my invention, what I claim as new and desire to secure by Letters Patent, is:—

1. In a device for projecting motion pictures, means for moving a film steadily past an opening, and a slitted drum moving with relation to said film, said slits lying transverse to the line of movement of said film, and interspaced one-half the desired height of pictures upon said film, and means for moving said drum at a peripheral speed which is one-half the linear speed of said film.

2. In a motion picture device, a sprocket for moving a film, a drum with transverse slits therein interspaced half the distance of a picture space on said film, said drum geared to said sprocket so that the slits and the film move in the same direction, and so that the linear speed of said slits will bear a predetermined ratio to the linear speed of said film.

3. In a motion picture device, a sprocket for moving a film, a drum with interspaced slits therein, a framing opening past which said film and said drum move, said slits in said drum interspaced half the height of said framing opening, said drum geared to said sprocket so that said drum and said film move past said opening in the same direction, the film moving twice as fast as the linear speed of said drum and means for causing light to act on said film from within said drum.

4. In a motion picture device, a sprocket for moving a film, a drum with interspaced slits therein, a framing opening past which said film and said drum move, said slits in said drum interspaced half the height of said framing opening, said drum geared to said sprocket so that said drum and said film move past said opening in the same direction, the film moving twice as fast as the linear speed of said drum and means for causing light to act on said film from within said drum, said means comprising means located within said drum and adapted to direct light through said slits.

5. In a motion picture apparatus, a film having a succession of image spaces therein, a continuous member arranged for motion with respect to said film, said member having means to confine light incident thereon to a plurality of lines of light, said lines positioned transversely of said film and being interspaced half the height of an image space therein and mechanical means for moving said film and said member together and at a speed such that the effective speed of said light lines is half the effective speed of said film.

6. In motion picture apparatus, a film having a succession of image spaces thereon, a second film having alternating opaque areas and transparent areas, said transparent areas in the form of transverse relatively thin lines interspaced half the height of said image spaces and means for moving said films in the same direction at predetermined relative speeds.

7. In a motion picture apparatus, a film having a succession of image spaces thereon, and a continuous member adapted for movement in the same direction as said film, said member having means to confine light incident thereon to transverse relatively thin lines interspaced half the height of said image spaces, the effective width of said lines of light being of the order of .002 inches.

8. In motion picture apparatus, an image film adapted to bear a succession of image spaces, a second film having alternating opaque portions and transparent portions, said transparent portions being in the form of transverse relatively thin lines, a sprocket member engaging said first mentioned film, a sprocket member engaging said second mentioned film and a mechanical connection therebetween such that the peripheral speed of said second sprocket member bears a predetermined ratio to the peripheral speed of said first sprocket.

9. In motion picture apparatus, a film adapted to carry a succession of image spaces, a second film having alternating opaque portions and transparent portions, said transparent portions being in the form of transverse relatively thin lines interspaced half the height of said image spaces and means for moving said films in the same direction at a predetermined speed ratio, the opaque portions upon said second film being of photographically reduced silver.

10. In motion picture apparatus, a film adapted to carry a succession of image spaces, a second film having alternating opaque portions and transparent portions, said transparent portions being in the form of transverse relatively thin lines interspaced half the height of said image spaces and means for moving said films in the same direction at a predetermined speed ratio, the opaque portions upon said second film being of photographically reduced silver, said lines being of the order of .002 inches in width.

11. In motion picture apparatus, an image film adapted to bear a succession of image spaces, a second film having alternating opaque portions and transparent portions, said transparent portions being in the form of transverse relatively thin lines, a sprocket plate engaging said first mentioned film, a sprocket plate engaging said second mentioned film and a mechanical connection therebetween, such that the peripheral speed of said second mentioned sprocket plate is one half the peripheral speed of said first mentioned sprocket plate.

12. A motion picture apparatus, in combination with a film adapted to bear a succession of image spaces, means for confining incident light to a plurality of interspaced transverse lines, said means being formed of interspaced bars and means for holding said bars to a predetermined spacing, and means for moving said bars and said film at predetermined different speeds.

13. A motion picture apparatus, in combination with a film adapted to bear a succession of image spaces, means for confining incident light to a plurality of interspaced transverse lines, said means being formed of interspaced bars and means for holding said bars to a predetermined spacing of the order of .002 inches, and means for moving said bars and said film at predetermined different speeds.

14. A motion picture apparatus, in combination with a film adapted to bear a succession of image spaces, means for confining incident light to a plurality of interspaced transverse lines, said means being formed of interspaced bars and means for holding said bars to a predetermined spacing, the adjacent sides of said bars being convergent from the light incident side outwardly, and means for moving said bars and said film at predetermined different speeds.

15. A motion picture apparatus, in combination with a film adapted to bear a succession of image spaces, means for confining incident light to a plurality of interspaced transverse lines, said means being formed of interspaced bars and means for holding said bars to a predetermined spacing, the sides of said bars on the light incident side being beveled outwardly and having light reflective surfaces, and means for moving said bars and said film at predetermined different speeds.

PAUL WILLIAM DORST.